United States Patent [19]
Adler et al.

[11] Patent Number: 5,469,928
[45] Date of Patent: Nov. 28, 1995

[54] ASSISTED STEERING SYSTEM FOR NON-TRACKBOUND VECHILE

[75] Inventors: Uwe Adler, Schweinfurt; Hans-Jürgen Drexl, Schonungen/Mgb.; Dieter Lutz, Schweinfurt; Franz Nagler, Ottendorf; Martin Ochs; Stefan Schiebold, both of Schweinfurt; Hans-Joachim Schmidt-Brücken, Geldersheim; Wolfgang Thieler, Haßfurt; Michael Wagner, Niederwerrn; Holger Westendorf, Hambach; Rainer Wychnanek, Madenhausen; Manfred Röder, Schwebheim, all of Germany

[73] Assignee: Mannesmann Aktiengesellschaft, Dusseldorf, Germany

[21] Appl. No.: 211,847

[22] PCT Filed: Oct. 6, 1992

[86] PCT No.: PCT/DE92/00859

§ 371 Date: Jun. 20, 1994

§ 102(e) Date: Jun. 20, 1994

[87] PCT Pub. No.: WO93/08063

PCT Pub. Date: Apr. 29, 1993

[30] Foreign Application Priority Data

Oct. 6, 1991 [DE] Germany .......... 41 34 240.2

[51] Int. Cl.$^6$ .................................. B62D 11/04
[52] U.S. Cl. .......... 180/6.28; 180/65.5; 180/242; 364/424.05
[58] Field of Search .............. 180/6.28, 6.26, 180/6.24, 6.5, 6.48, 6.44, 6.62, 65.5, 65.4, 65.3, 242, 244, 252; 364/424.05, 424.1, 426.01, 426.04

[56] References Cited

U.S. PATENT DOCUMENTS

| | | | |
|---|---|---|---|
| 3,970,160 | 7/1976 | Nowick | 180/6.5 |
| 4,196,785 | 4/1980 | Downing, Jr. | 180/6.28 |
| 4,953,646 | 9/1990 | Kim | 180/65.4 |
| 5,222,568 | 6/1993 | Higasa et al. | 180/242 X |
| 5,258,912 | 11/1993 | Ghoneim et al. | 180/6.28 X |
| 5,323,866 | 6/1994 | Simard et al. | 180/6.28 |

FOREIGN PATENT DOCUMENTS

| | | |
|---|---|---|
| 44773 | 1/1982 | European Pat. Off. . |
| 2418136 | 9/1979 | France . |
| 55260 | 4/1982 | Japan . |
| 181918 | 8/1987 | Japan . |
| 1307088 | 2/1973 | United Kingdom . |
| 2203396 | 10/1988 | United Kingdom . |

Primary Examiner—Eric D. Culbreth
Assistant Examiner—Kevin Hurley
Attorney, Agent, or Firm—Cohen, Pontani, Lieberman, Pavane

[57] ABSTRACT

Steering is actively assisted in a turning motor vehicle including a hybrid drive having both an internal combustion engine and a generator unit. The inner and outer wheels are each associated with an individual drive which is controlled in accordance with the steering angle of the steered wheels. Specifically, the torque differential is adjusted such that the percentage actual wheel differentials approach the percentage reference wheel speed differentials. A substantial reduction in the force which must be applied via the steering system to adjust the steering wheels, as compared to an absence of torque differential, is achieved because the outer wheel is driven at a higher output than the inner wheel when making a turn.

6 Claims, 3 Drawing Sheets

ASSISTED STEERING SYSTEM FOR NON-TRACKBOUND VECHILE

1. Field of the Invention

The invention relates to non-trackbound or non-railborne vehicles with at least two pairs of wheels, generally, and more particularly to vehicles in which the left and right wheel of at least one of the pairs can be adjusted by a steering wheel and in which each wheel of at least one of the pairs is individually driven by a corresponding drive.

2. Description of the Prior Art

Assisted steering (servo-steering) is commonly used in non-railborne vehicles, i.e. passenger cars, trucks, busses and the like, which are generally driven by means of internal combustion engines. A hydraulic pump driven by the internal combustion engine serves as an energy source providing the power required for boosting the force applied to the steered wheels by the operator of the vehicle via the steering wheel. In addition to the hydraulic pump, control valves, steering valves, steering cylinders, an oil tank and line connections are required. Accordingly, assisted steering systems were formerly very costly.

More recently, new drive concepts for vehicles have been developed which diverge sharply from the internal combustion engine drives commonly known for decades. For example, non-railborne vehicles with battery-powered electric motor drives have been suggested. There have also been suggestions for hybrid drives in which an internal combustion engine/generator unit is provided at the vehicle and the electrical power supplied by the generator is fed via power electronics to electric motors which are rigidly coupled with the driven wheels. Such drives have certain advantages, since they allow differentiated steering as pure internal combustion engine drives.

A substantial feature of vehicles with electric motors driving at least two wheels consists in that the driven wheels each have their own electric motors.

A key element in the gradual conversion of motor vehicles driven only by internal combustion engines to electric vehicles or vehicles with a hybrid drive consists in adapting the handling of these new vehicles to the handling of vehicles driven by internal combustion engines. In terms of the vehicle steering system, this would mean providing assisted steering, since substantial resistance must be overcome particularly in heavy vehicles with rubber tires. Conventional techniques for assisted steering are provided for this purpose, i.e., in the case of electrically driven hydraulic motors, conventional servo-steering could be applied. The steering could also be effected by means of electric motors, i.e. an electric motor is actuated depending on the steering wheel position in order to move the steering linkage. However, this type of assisted steering is also quite expensive.

A vehicle drive is known from JP 62-181 918 A in which a mechanical transmission controlled via hydraulic clutches is provided for the rear axle of the vehicle, by means of which the distribution of torque between the two driving wheels on the left and right sides of the rear axle can be influenced depending on the speed of the vehicle and the angle and actuating speed of the steering wheel in such a way that the driving wheel on the outside of the turn receives greater torque than the inner driving wheel. The required cost for this construction is extremely high. More detailed information regarding the applied regulating strategy in the torque adjustment is not provided in this prior art.

When making a turn, the speed of the outer wheel is naturally greater than that of the inner wheel. The so called single-track model serves as a basis for calculation, whereby with reference to the accompanying FIG. 1 with a reference turning radius R, the "Ackermann" steering angle $\delta_A$ depending on the steering wheel angle is calculated as follows:

$$\tan \delta_A = 1/\sqrt{R^2 - l_2^2} \quad (1)$$

with $$l_2 = (m_v/m_g) \cdot 1 \quad (2),$$

where

- 1=axial distance
- 2=distance of the center of gravity SP from the rear axle
- R=reference turning radius
- $\delta_A$=steering angle
- $m_v$=weighted front wheel axle load
- $m_g$=total weight of vehicle.

It will be seen that the percentage wheel speed differential between the outer and inner wheels of the vehicle can be determined by this single-track model allowing for the track width of the vehicle.

Theoretically, a linear relationship is given when the percentage wheel speed differential between the outer and inner wheel is applied to the wheel in question via the steering wheel; the percentage wheel speed differential is approximately 10% at a steering angle of 10° at the wheel.

In a vehicle having a single-wheel drive, the drive output is determined by the driver by actuating the accelerator pedal. This drive output must be transmitted in its entirety to the driving wheels. Thus, the total drive output determined by the driver is the sum of the single-wheel drive outputs.

SUMMARY OF THE INVENTION

The aforementioned object, as well as others which will become apparent from the description provided herein, is met by a vehicle in which the torque transmitted to the outer wheel or the output transmitted thereto (the output is in a linear relationship with the torque by way of the speed) is increased depending upon the steering wheel angle and therefore upon the steering angle at the wheel, whereas the torque or output at the inner wheel is decreased to a corresponding degree.

The driver of the vehicle positively perceives the change in driving torque of the outer and inner wheel in an easy steerability of the vehicle.

A particular advantage of the invention consists in that the individual drives for the driven wheels are constructed as electric motors and are already separately controlled. The steering angle can therefore be taken into account in the control of the power supply to the driving electric motors in a very simple manner.

According to the basic ideas of the invention, the torques applied to the driven wheels are increased and reduced depending on the theoretically determined percentage wheel speed differential depending on the steering angle. This applies particularly for relatively low vehicle speeds (e.g. less than 50 km/h) at which the theoretical values are retained entirely or almost entirely (e.g. 80 or 90%).

However, based on general experience and viewpoints according to the invention, an increasing deviation from the linear characteristic line based on the "Ackermann" theory is provided at higher vehicle speeds.

FIG. 3 shows the linear theoretical "Ackermann" relationship between the steering wheel angle δ and the percentage wheel speed differential between the right and left wheels in the form of a straight line A. When making a turn, the driver turns the steering wheel of the vehicle. In so doing, certain speeds and consequently certain speed differentials are adjusted in the steered wheels. The speeds of the wheels can be detected by sensors and a deviation between the actual differential and the reference differential can be calculated according to FIG. 3 based on the determined differential. This deviation is used as a control variable for the increase or decrease in driving torque for the individual outer and inner driving wheels.

It is known that at extremely slow vehicle speeds, the actual wheel speed differential deviates slightly from theory. At higher vehicle speeds, the actual wheel speed differentials always diverge more sharply from the theoretical values. This is shown in FIG. 3 by a family of characteristic lines with a vehicle speed v as parameter.

Curve B in FIG. 3 shows the qualitative actual wheel speed differential as a function of the steering wheel angle at a vehicle speed of 50 km/h, the characteristic lines C and D are representative qualitatively for vehicle speeds of 100 km/h and 150 km/h.

If the adjustment of the various driving torques of the outer and inner wheels were oriented exclusively to the theoretical characteristic line A, the difference in the driving torques would be too great at high vehicle speeds, resulting in an unusually high degree of assisted steering which the driver would perceive as oversteering.

Consequently, the invention provides that the individual drives are adjusted in such a way that the percentage wheel speed differentials between the outer and inner wheels approximately satisfy the theoretical, geometrical "Ackermann" relationship, at least at low vehicle speeds, wherein the difference between the actual wheel speed differential and the theoretical reference wheel speed differential is used as a control variable, while there is an increasingly sharp deviation from the geometrical relationship at higher vehicle speeds.

In an advantageous further development of the invention, the differences in torque between the outer wheel and the inner wheel should be higher a) at higher steering wheel angle speeds and/or b) at greater steering wheel angles.

The adjustment of smaller wheel speed differentials at higher vehicle speeds by relatively small differences in torque is shown in the family of characteristics shown in FIG. 3. This gives the curve of the proportions of the theoretical reference wheel speed differentials adjusted by controlling the vehicle drive shown in FIG. 4. In a vehicle speed range approaching zero, the adjustment of the wheel speed differentials is 100% corresponding to the theoretical characteristic line A or, e.g., characteristic line A' in FIG. 3 which deviates only slightly from the latter. As the speed of the vehicle increases, the deviation from the theoretical characteristic line is allowed to increase continuously. Thus, the respective speed differential becomes increasingly smaller, i.e. only a small proportion of the theoretical reference speed differential is adjusted. At high vehicle speeds, there is practically no assisted steering; the steering is virtually direct or immediate.

In this context, low speed refers to a speed below 40 km/h. Until this point, the aimed for speed differential (reference wheel speed differential) may be no more than a maximum of 20% less than the theoretical "Ackermann" speed differential. This deviation should be less than 10% below a speed of e.g. 25 km/h. At speeds below 10 km/h, the speed differential according to "Ackermann" should be retained as far as possible. On the other hand, at higher vehicle speeds, only a fraction of the theoretical "Ackermann" differential is adjusted, for example less than 60% of this differential at a speed of more than 100 km/h.

In accordance with an illustrative embodiment of the present invention the difference in the driving torques applied to the individually driven wheels increases at higher steering wheel angle speeds. That is, when the steering wheel is turned very quickly, a very high degree of assisted steering is effected. This relationship is shown in FIG. 6, in which the torque differential is shown over the steering wheel angle speed δ as a qualitative function. Other steadily increasing functional curves (e.g. degressive or progressive) can also be used.

The torque differentials are also dependent on the steering wheel angle. With a greater turning of the steering wheel or higher steering wheel angles, the difference in torque between the outer wheel and inner wheel should also be greater according to alternative b). According to FIG. 7, this dependence is not linear, but is somewhat flattened at greater steering wheel angles. Accordingly, when parking the vehicle, for example, a very high degree of assisted steering is advantageously effected when the steering wheel is turned by a large amount so that, e.g., parallel parking is very convenient. When the steering wheel is moved very quickly in addition, a high responsiveness of the assisted steering is achieved by means of the temporary overproportionate assisted steering as a result of a temporarily great torque differential between the outer and inner driving wheels.

FIG. 7 also shows the dependence of the change in torque on the vehicle speed. Curve X represents low vehicle speeds, curve Y represents medium speeds, and curve Z represents high vehicle speeds.

When the above aspects are considered in combination, a torque differential δM between the outer wheel and inner wheel for a change in the steering wheel angle δ over time results as shown by way of example in FIG. 5. At first, the steering wheel angle 6 changes slowly but steadily, assuming a constant mean vehicle speed. Accordingly, the torque differential, i.e. the extent of assisted steering, also changes. In a segment Δt, the steering wheel rotation is accelerated. Consequently, there is also an increase in the torque differential ΔM and accordingly in the assisted steering according to FIG. 6, since the angle speed of the steering wheel is increased. Further, the harder turning of the steering wheel according to FIG. 7 results in an additional increase in the assisted steering. In FIG. 5, the torque differential ΔM is characterized by a sharply ascending segment. When the movement of the steering wheel slows down again, as shown in FIG. 5 by a gradually flatter slope of the curve δ, the assisted steering drops somewhat. According to the characteristic field shown in FIG. 7, there is hardly any further increase in the assisted steering as the steering wheel angle δ continues to increase in a uniformly continuous manner, which is attributable to the flattening of the family of curves in FIG. 7 at higher values of δ.

Thus, with a given individual wheel drive, the invention makes it possible to realize an assisted steering system at an extremely low cost and steps may be taken, also at a low cost, which permit a simple and reliable steering of the vehicle in practically any situation.

The various features of novelty which characterize the invention are pointed out with particularity in the claims annexed to and forming a part of the disclosure. For a better understanding of the invention, its operating advantages, and specific object attained by its use, reference should be had to the drawings and descriptive matter in which there are illustrated and described preferred embodiments of the invention.

BRIEF DESCRIPTION OF THE DRAWINGS

Illustrative embodiments of the present invention will be explained in more detail in the following with reference to the drawings, in which.

DETAILED DESCRIPTION OF THE PREFERRED EMBODIMENTS

Figure 1:
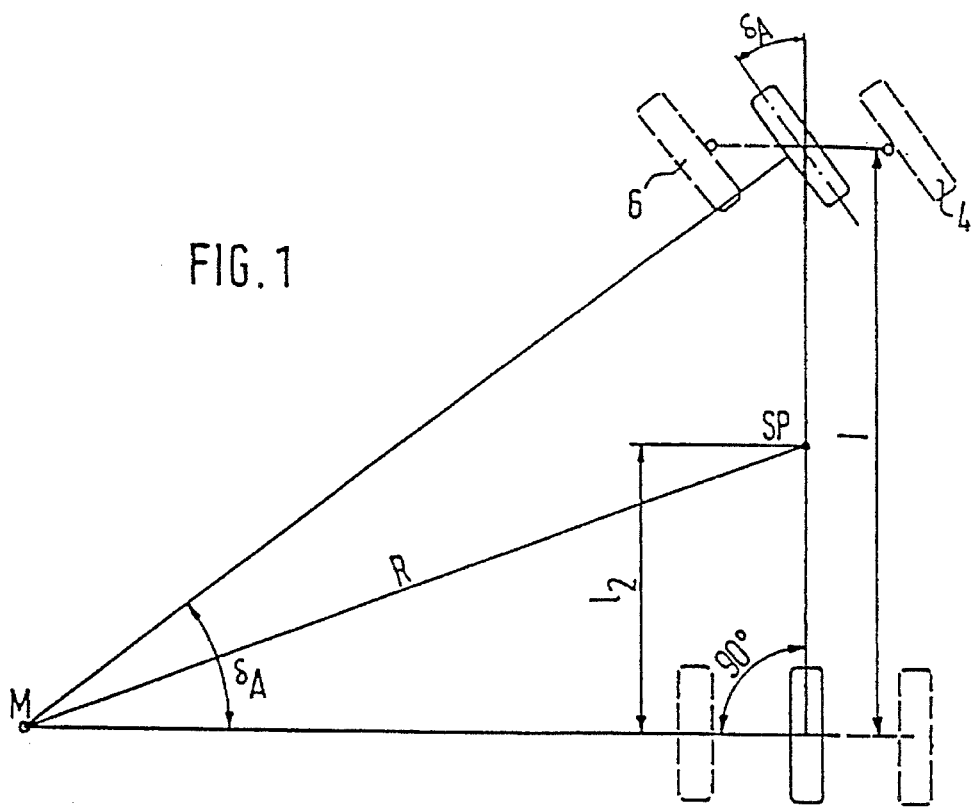
FIG. 1 is a graph illustrating the calculation of the wheel speed differentials in a vehicle while making a turn.
Figure 2:
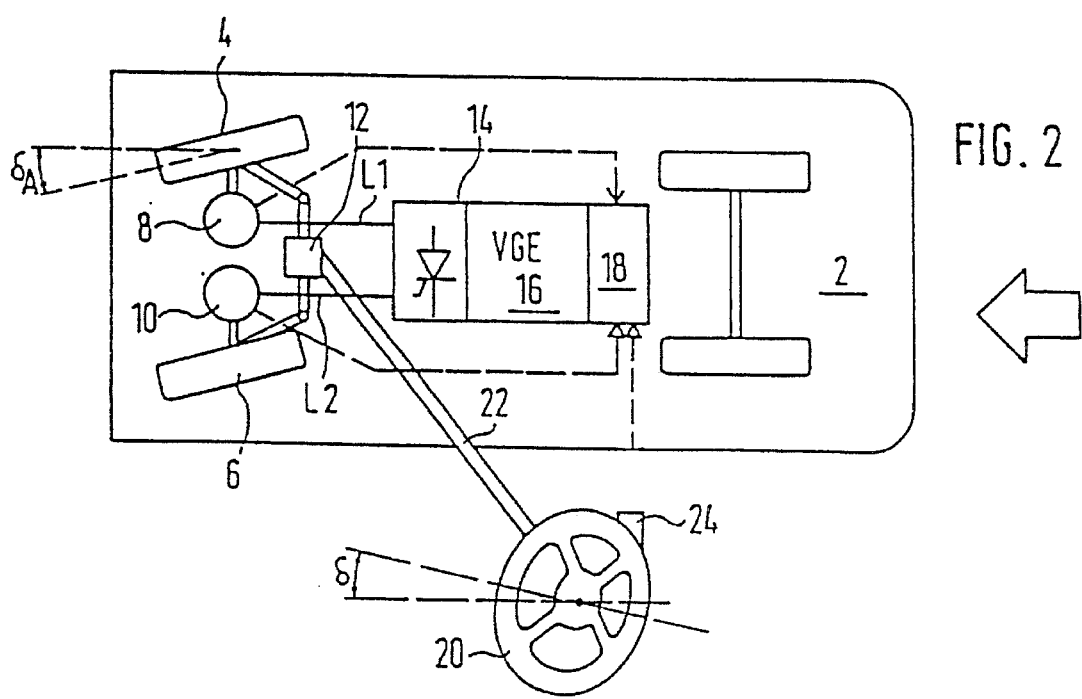
FIG. 2 shows a schematic diagram of a vehicle which is outfitted with an internal combustion engine/generator unit (VGE) and with assisted steering according to the invention.

FIG. 2 is a schematic view of a passenger automobile 2 with a non-driven rear wheel pair and a pair of driven front wheels which are adjusted in this instance to a steering angle $\delta_A$ for a left-hand turn.

The outer front wheel 4 with respect to the turn is driven by an electric motor 8 which is coupled with it, the inner front wheel 6 is driven by an electric motor 10 coupled therewith. A steering linkage of conventional construction is coupled via a steering gear 12 and a steering column 22 with a steering wheel 20. A turning $\delta$ of the steering wheel results in a steering angle $\delta_A$ of the front wheels 4 and 6.

The vehicle 2 has an internal combustion engine/generator unit (VGE) 16 as power source. The generator part supplies electric current to a power distributor 14 outfitted with power electronics. The power distributor 14 controls the power supply to the two electric motors 8 and 10 individually via feed lines L1 and L2. The power distributor 14, VGE 16 and other components of the vehicle 2 not of concern in the present context are controlled by a control unit 18 which is equipped with a microprocessor and receives the sensor signals of different sensors for this purpose.

In particular, the control unit 18 receives wheel speed signals which are tapped at the electric motors 8 and 10 coupled with the front wheels 4 and 6. The signal paths are shown in FIG. 2.

Moreover, the control unit 18 receives a position signal representing the steering wheel angle or steering wheel turn $\delta$ by means of a sensor 24 arranged in the region of the steering system.

From a throttle, not shown, the control unit 18 receives a signal characterizing the output demanded by the driver. Accordingly, the control unit 18 controls the VGE 16 and the power distributor 14 in order to make the output required by the driver available to the wheels 4 and 6 via the electric motors 8 and 10. Depending on the steering angle $\delta_A$ and consequently on the steering wheel angle $\delta$, the control unit 18 generates a driving torque differential corresponding to a percentage wheel revolution differential between the outer wheel 4 and inner wheel 6 via the power distributor 14. The output and torque at the electric motor 8 coupled with the outer wheel 4 is increased by a certain amount based on the overall drive output, and the output of the electric motor 10 coupled with the inner wheel 6 is reduced (e.g. by an equal amount).

In a modified embodiment, each of the four wheels of the vehicle can be outfitted with its own electric motor. All wheels can be then controlled individually when turning a corner.

In another modified embodiment, the rear wheels of the vehicle can be driven, while the front wheels merely run along and are coupled with the steering. The individually driven wheels can be identical to the steered wheels, but this is not necessary.

The sensor 24 shown in a simplified manner at the steering wheel in FIG. 2 is advisably arranged at the steering gear 12 or at the steering linkage.

Figure 3:
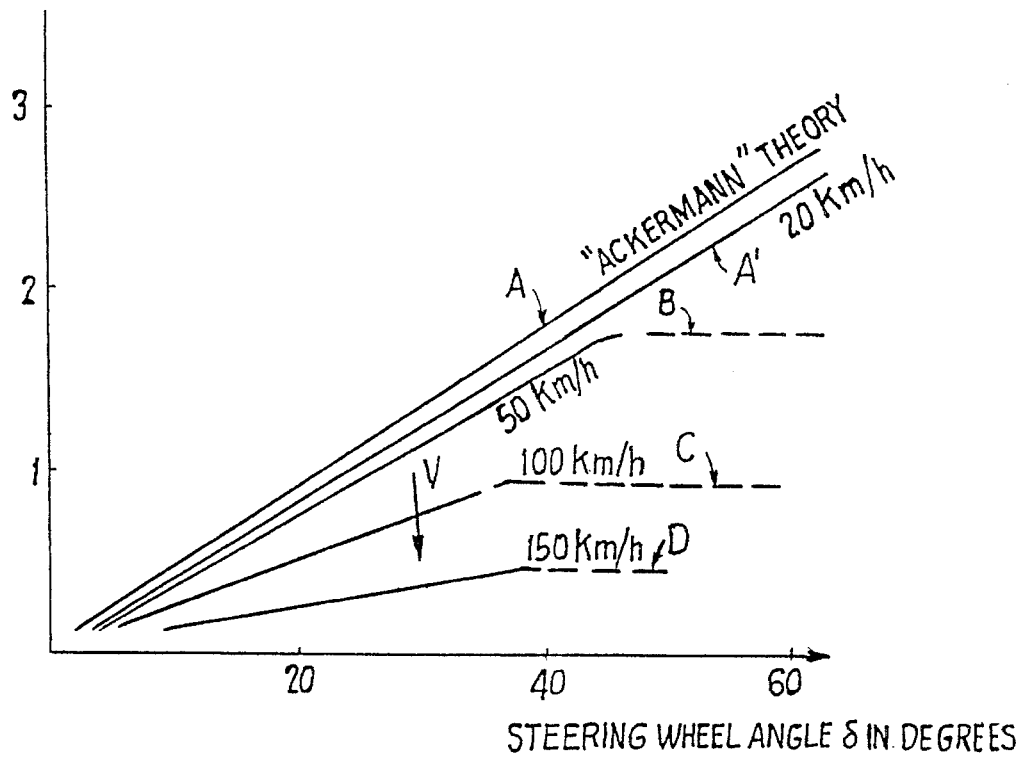
FIG. 3 is a graph showing the dependence of the wheel speed differential on the steering wheel angle.

As already mentioned, the percentage wheel speed differential when cornering corresponds in theory to a straight line A in FIG. 3. At very low speeds, a torque distribution is carried out—depending on the steering wheel angle $\delta$—in such a way that the reference wheel speed differential according to the straight line A in FIG. 3 is achieved with the driving torques applied to the individually driven wheels. In other words, the control variable is the difference between the reference wheel speed differential according to the straight line A in FIG. 3 and the actual wheel speed differential detected by the control unit 18 via the sensors at the electric motors 8 and 10.

As a result of the adjustment of the driving torque differential when cornering, the outer side of the vehicle is driven at greater power than the inner side. In extreme cases, this torque distribution leads to a braking of the inner wheels or inner wheel. The steering is actively assisted by means of the torque distribution: the required force to be applied for moving the steering linkage is considerably smaller than would be the case if no torque differential were adjusted when cornering.

Figure 4:
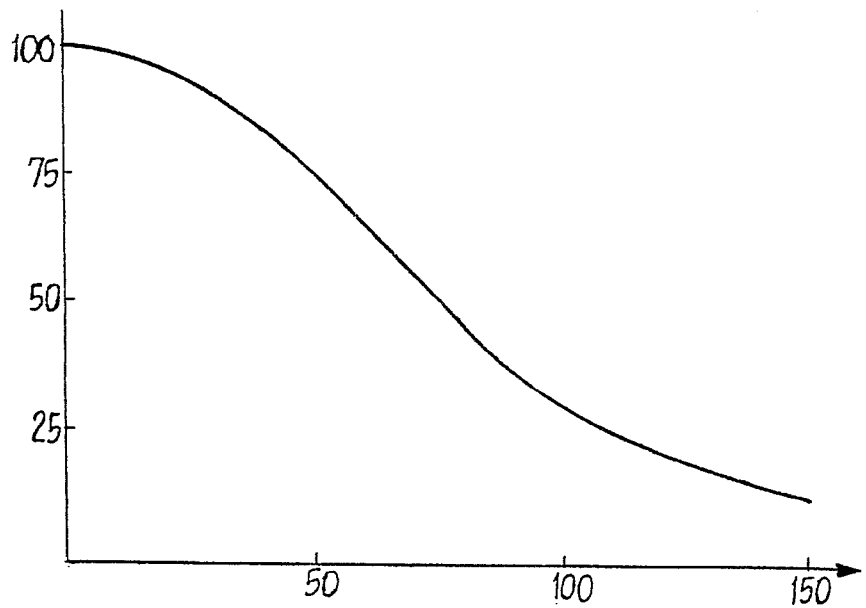
FIG. 4 is a graph representing the compensation of the wheel speed differentials depending on the vehicle speed.
Figure 5:
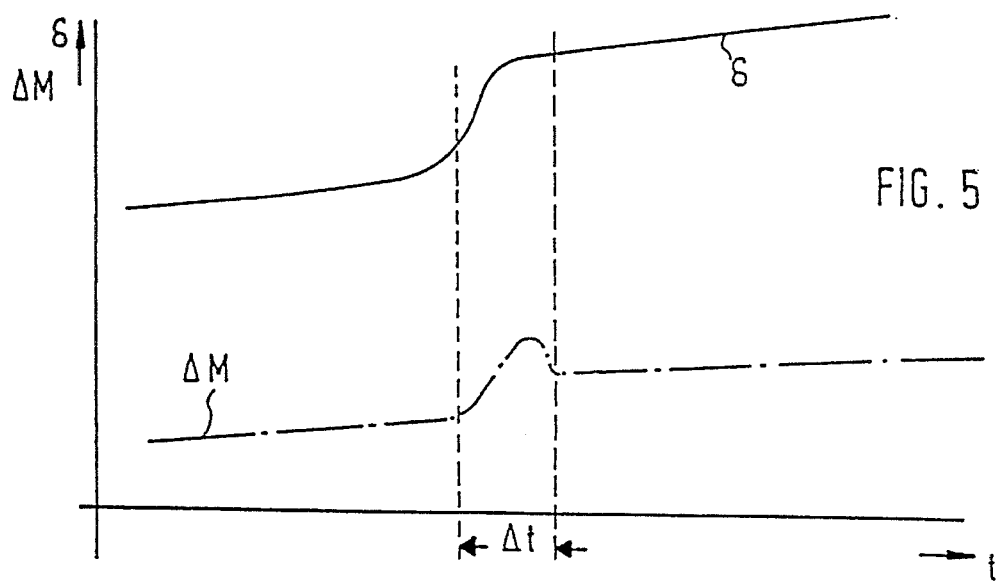
FIG. 5 is a graph showing the relationship between the steering wheel angle and the torque differential generated for assisted steering at the individually driven wheels of the vehicle according to FIG. 2 as a function of time.

As already mentioned above, the adjustment of the torque differential is effected as a function of the vehicle speed. The higher the vehicle speed, the smaller the differential. This is shown schematically in FIGS. 3 and 4.

Figure 6:
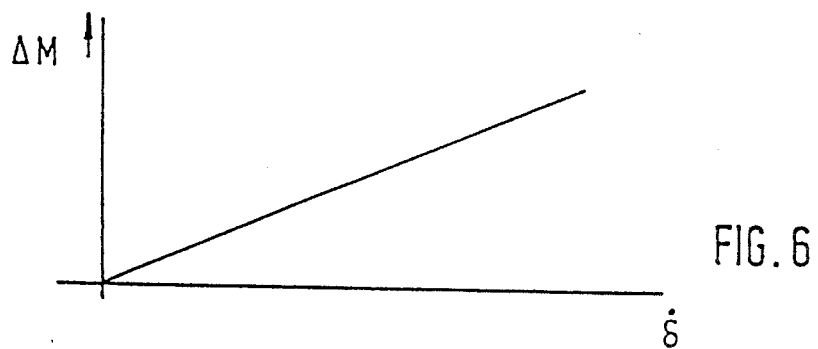
FIG. 6 is a graph showing the relationship between the steering wheel angle speed and the torque differential for the individually driven wheels.
Figure 7:
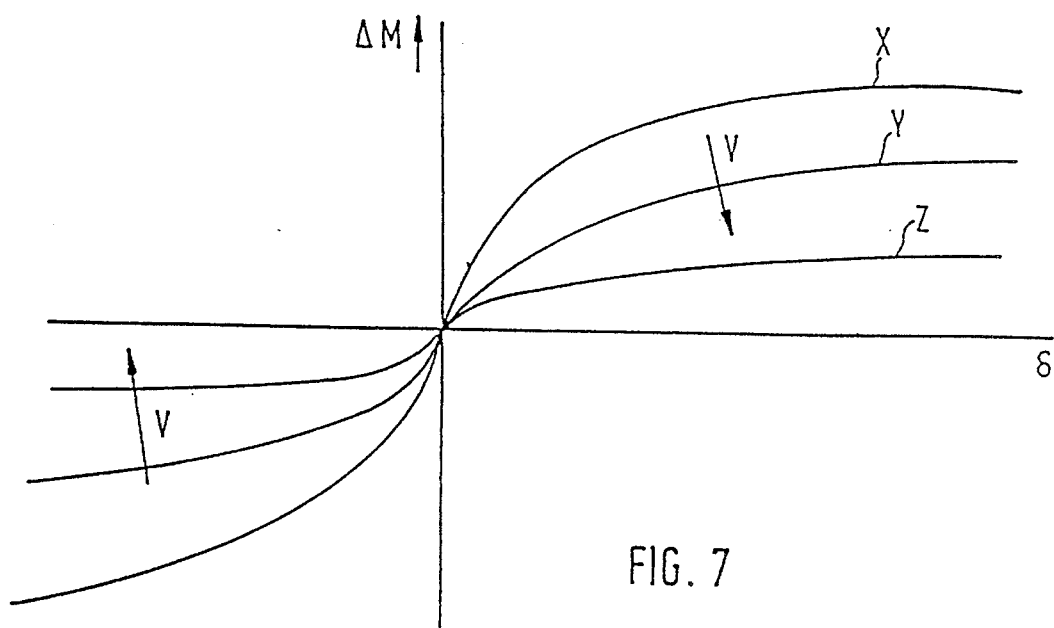
FIG. 7 is a graph showing the dependence of the torque differential generated at the individually driven wheels with the vehicle speed as parameter depending on the steering wheel angle.

Further, the extent of assisted steering, i.e. the extent of the torque differential, is effected as a function Of the steering wheel position and the steering wheel angle speed as is shown in FIGS. 6 and 7.

Of course, the present invention is also applicable in vehicles with more than one pair of steered wheels, e.g. in passenger automobiles with steered front and rear axles.

We claim:

1. A vehicle comprising:
    at least two pairs of wheels having a left and right wheel, at least one of said pairs of wheels being coupled to a steering wheel manipulable into a steering angle for turning the vehicle:
    a plurality of electric drive motors, each respective drive motor being operable to independently drive a corresponding one of said wheels such that during a turn one of said drive motors is associated with an inner wheel and another of said drive motors is associated with an outer wheel; and steering assisted means for controlling said drive motors in accordance with steering wheel angle, said steering assisting means operating the drive motor associated with the outer wheel at a higher torque than the drive motor associated with the inner wheel to achieve a percentage wheel speed differential between said inner and outer wheels, wherein said drive motors are adjusted at lower vehicle speeds to achieve percentage wheel speed differentials in accordance with a predetermined linear relationship between steering wheel angle and percentage wheel speed differential and at higher vehicle speeds to achieve percentage wheel speed differentials which are increasingly smaller with increasing speed.

2. The vehicle according to claim 1, wherein said assisting means is operable to adjust the individual drives in such a way that the torque differentials between the outer and inner wheel increase as the steering wheel angle increases.

3. The vehicle according to claim 1, further including an internal combustion engine/generator unit and means for distributing electrical power supplied by the generator to the electric motors in a controlled manner.

4. The vehicle according to claim 1, further including a steering wheel sensor for detecting steering wheel position.

5. The vehicle according to claim 1, wherein a difference between an actual wheel speed differential and a theoretical reference wheel speed differential derived in accordance with said linear relationship is used as a control variable.

6. The vehicle according to claim 1, wherein said steering assisting means is operable to adjust the individual drive motors in such a way that the torque differentials between the outer and inner wheel increase as steering wheel angle speed increases.

* * * * *